United States Patent
Iizuka et al.

(10) Patent No.: US 7,853,231 B2
(45) Date of Patent: Dec. 14, 2010

(54) MOBILE COMMUNICATION TERMINAL AND ASSOCIATED METHODOLOGY FOR RECEPTION DURING DIVERSITY INTERRUPTION

(75) Inventors: Yousuke Iizuka, Yokosuka (JP);
Shinsuke Ogawa, Yokohama (JP);
Masahiro Sakai, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 465 days.

(21) Appl. No.: 11/661,115

(22) PCT Filed: Jan. 17, 2006

(86) PCT No.: PCT/JP2006/300536

§ 371 (c)(1),
(2), (4) Date: Feb. 26, 2007

(87) PCT Pub. No.: WO2006/077832

PCT Pub. Date: Jul. 27, 2006

(65) Prior Publication Data

US 2008/0096510 A1 Apr. 24, 2008

(30) Foreign Application Priority Data

Jan. 18, 2005 (JP) .............................. 2005-010859

(51) Int. Cl.
*H04B 1/10* (2006.01)
(52) U.S. Cl. .................................. 455/277.1; 455/278.1
(58) Field of Classification Search .............. 455/67.11, 455/132, 133, 134, 135, 136, 137, 140, 272, 455/343.2, 504, 562.1, 574, 272.1, 277.2, 455/278.1
See application file for complete search history.

(56) References Cited

U.S. PATENT DOCUMENTS

| 7,024,168 | B1 * | 4/2006 | Gustafsson et al. | ......... 455/135 |
|---|---|---|---|---|
| 2003/0153358 | A1 * | 8/2003 | Moon et al. | .................. 455/561 |
| 2003/0190903 | A1 * | 10/2003 | Melamed | .................. 455/277.1 |
| 2004/0253955 | A1 * | 12/2004 | Love et al. | .................. 455/442 |
| 2005/0197080 | A1 * | 9/2005 | Ulupinar et al. | ............. 455/135 |

FOREIGN PATENT DOCUMENTS

| EP | 1 065 805 | 1/2001 |
|---|---|---|
| JP | 56 122532 | 9/1981 |
| JP | 56 168440 | 12/1981 |
| JP | 6 13945 | 1/1994 |

(Continued)

OTHER PUBLICATIONS

Chineses Office Action dated Feb. 5, 2010 issued in a counterpart Chinese Patent Application No. 200680001001.1, 12 pages (with English Translation).

*Primary Examiner*—Blane J Jackson
(74) *Attorney, Agent, or Firm*—Oblon, Spivak, McClelland, Maier & Neustadt, L.L.P.

(57) ABSTRACT

When the diversity reception is cut, communications with the base station are continued. When it is judged by the judgment section of the mobile communication terminal that a predetermined disconnection requirement for disconnecting diversity reception is satisfied, the gain control section of the digital baseband circuitry 20 reduces the gain of the AGC14B contained in the RF receiver circuitry 10B constituting the disconnection target by a fixed value at fixed times. Diversity reception is cut after the level of the signal output by the AGC14B has reached zero.

8 Claims, 12 Drawing Sheets

FOREIGN PATENT DOCUMENTS

| | | |
|---|---|---|
| JP | 7 273705 | 10/1995 |
| JP | 8 79146 | 3/1996 |
| JP | 2001 16146 | 1/2001 |
| JP | 2002-271239 | 9/2002 |
| WO | WO 01/05088 A1 | 1/2001 |

* cited by examiner

MOBILE COMMUNICATION TERMINAL AND ASSOCIATED METHODOLOGY FOR RECEPTION DURING DIVERSITY INTERRUPTION

TECHNICAL FIELD

The present invention relates to a mobile communication terminal in which a plurality of receiver are installed and to a reception diversity disconnection method.

BACKGROUND ART

In recent years, the popularization of the Internet has been rapid with the sources of information becoming more diverse and information capacity increasing. At the same time, the research and development of next generation wireless access systems for implementing high-speed wireless communications in the field of mobile communications have been actively pursued. Next generation wireless access systems include, for example, a HSDPA (High Speed Downlink Packet Access) system which uses Adaptive Modulation and channel Coding (AMC) in which the throughput is determined in accordance with the reception environment of the mobile communication terminals (See FIG. 2). When an HSDPA system is used, the throughput can be rapidly improved. However, in comparison with conventional W-CDMA technology, a mobile communication terminal with more favorable reception sensitivity is required in order to rapidly improve the throughput.

One technology for improving the reception sensitivity of the mobile communication terminal is diversity reception technology which combines and selects signals that are input from a plurality of antennae by mounting a plurality of reception devices in the mobile communication terminal. A technology relating to diversity reception is disclosed in Japanese Patent Application Laid Open No. H8-79146.

Here, with regard to the flow of signals processed in a conventional non-diversity reception mobile communication terminal, the circuit constitution diagram of the mobile communication terminal shown in FIG. 5 will be described hereinbelow. First, the reception signal received by an antenna 81 is amplified while preserving its RF (Radio Frequency) band by an LNA (Low Noise Amplifier) 82. Thereafter, the amplified signal is downconverted by a downconverter 83 and the downconverted signal is subjected to linear amplification by an AGC (Automatic Gain Control) 84. Thereafter, the linearly amplified signal is subjected to quadrature detection by a quadrature detector 85 and the quadrature-detected signal is converted into a digital signal by the A/D converter 86. The digital signal resulting from the conversion is then demodulated by a digital baseband circuitry 90.

On the other hand, in the case of the conventional diversity reception mobile communication terminal shown in FIG. 4, RF receiver circuitries 80A and 80B are provided as a plurality of receiver devices. The RF receiver circuitries 80A and 80B have the same functions as the RF receiver circuitry 80 shown in FIG. 5. The digital baseband circuitry 90 shown in FIG. 4 combines and demodulates digital signals output by the respective RF receiver circuitries 80A and 80B for each antenna.

Further, the power consumption of a conventional diversity reception mobile communication terminal increases in comparison with the power consumption of a conventional non-diversity reception mobile communication terminal. However, when a standby state is used to reduce the power consumption of a conventional diversity reception mobile communication terminal, disconnecting the power supply of another receiver device by activating only one receiver device, that is, disconnecting the diversity reception may be considered. As a method for disconnecting the diversity reception, combining the signals by means of a digital baseband circuitry or performing amplification by means of the LNA of the RF receiver circuitry or the like, for example, may be considered.

However, when the diversity reception is cut expectedly, because the reception SIR (Signal-to-Interference power ratio: a measurement value of the mobile communication terminal that exhibits the reception quality) rapidly deteriorates, it is probable that communications with the base station (including communications with control signals) will be disconnected. This fact will be explained specifically with reference to FIG. 1. First, as shown in FIG. 1A, speech and packet communications are performed between the mobile communication terminal MS and base station BS and data and control signals are exchanged. The SIR of the mobile communication terminal MS in this state is 3 dB. Thereafter, as shown in FIG. 1B, when the diversity reception of the mobile communication terminal MS is unexpectedly cut at the same time that speech and packet communications end, the SIR of the mobile communication terminal MS rapidly deteriorates from 3 dB to −2 dB. When the SIR deteriorates rapidly in this manner, the control signal transmitted from the base station BS can no longer be received by the mobile communication terminal MS, as shown in FIG. 1C.

Further, in a conventional W-CDMA system (in a case where HSDPA is not applied), control is exercised so that the SIR and user throughput of the mobile communication terminal are kept at a fixed level through control of the transmission power by the base station. Therefore, improvements in user throughput are undesirable even when diversity reception is mounted in the mobile communication terminal. In addition, in order to reduce power consumption, disconnecting the diversity reception in HSDPA non-application cells may be considered. Further, in this case, when the mobile communication terminal moves from an HSDPA application cell to a non-application cell (handover), the reception diversity is unexpectedly disconnected. When the diversity reception is unexpectedly disconnected, the combined gain decreases and the SIR rapidly deteriorates. When the SIR rapidly deteriorates, because this cannot be tracked by means of the transmission power control by the base station, the call is disconnected. This will now be explained specifically with reference to FIG. 3. First, as shown in FIG. 3A, when the mobile communication terminal MS is present in an HSDPA application cell C1, the diversity reception operates and the SIR of the mobile communication terminal MS is 3 dB. In this state, the fact that the SIR of the mobile communication terminal MS is 3 dB is reported by the mobile communication terminal MS to both the base station BS1 of HSDPA application cell C1 and the base station BS2 of an HSDPA non-application cell C2. Thereafter, as shown in FIG. 3B, when the mobile communication terminal MS moves from the HSDPA application cell C1 to the HSDPA non-application cell C2, the diversity reception is disconnected. As a result, the SIR of the mobile communication terminal MS rapidly deteriorates from 3 dB to −2 dB. The fact that the SIR is now −2 dB is then reported by the mobile communication terminal MS to the base station BS2 of the HSDPA non-application cell C2. The base station BS2 that detects the fact that the SIR of the mobile communication terminal MS has rapidly deteriorated from 3 dB to −2 dB then disconnects the call of the mobile communication terminal MS.

DISCLOSURE OF THE INVENTION

Hence, in order to solve the above problem, it is an object of the present invention to provide a mobile communication terminal and diversity reception disconnection method that allow communications with a base station to be continued when diversity reception is disconnected.

The mobile communication terminal of the present invention is a diversity reception function mobile communication terminal comprising a plurality of receiver devices, comprising: judging means for judging whether a requirement for disconnecting diversity reception is satisfied; and controlling means for exercising control so that the reception quality of the signals received by the receiver devices drops, wherein, when it is judged by the judging means that the disconnection requirement is satisfied, the control means lowers the reception quality of the signal received by the receiver device constituting the disconnection target by a fixed value at fixed times.

Further, the diversity reception disconnection method of the present invention is a diversity reception disconnection method of a diversity reception function mobile communication terminal that comprises a plurality of receiver devices, comprising: a judging step of judging whether a diversity reception disconnection requirement is satisfied; and a controlling step of exercising control so that the reception quality of the signal received by the receiver device drops, wherein the controlling step lowers the reception quality of the signal received by the receiver device constituting the disconnection target by a fixed value at fixed times when it is judged in the judging step that the disconnection requirement is satisfied.

According to these inventions, communications with the base station can be continued when diversity reception is cut.

In the mobile communication terminal of the present invention, the controlling means controls the gain of the amplifier contained in the receiver devices and, when it is judged by the judging means that the disconnection requirement is satisfied, the controlling means preferably lowers the gain of the amplifier contained in the receiver device constituting the disconnection target by a fixed value at fixed times. Further, in the diversity reception disconnection method of the present invention, the controlling step controls the gain of the amplifier contained in the receiver device and, when it is judged in the judging step that the disconnection requirement is satisfied, the controlling step preferably reduces the gain of the amplifier contained in the receiver device constituting the disconnection target by a fixed value at fixed times.

In the mobile communication terminal of the present invention, the controlling means combines the signals output by the receiver devices and, when it is judged by the judging means that the disconnection requirement is satisfied, the controlling means preferably adds pseudonoise to the signal output by the receiver device constituting the disconnection target while increasing the signal level of the pseudonoise by a fixed value at fixed times. Furthermore, in the diversity reception disconnection method of the present invention, the controlling step preferably combines signals output by the receiver devices and, when it is judged in the judging step that the disconnection requirement is satisfied, the controlling step preferably adds pseudonoise to the signal output by the receiver device constituting the disconnection target while increasing the signal level of the pseudonoise by a fixed value at fixed times.

In the mobile communication terminal of the present invention, the controlling means preferably combines the signals output by the receiver devices and, when it is judged by the judging means that the disconnection requirement is satisfied, the controlling means preferably multiplies the output signal output by the receiver device constituting the disconnection target by a weight matrix so that the reception quality of the output signal drops by a fixed value at fixed times. Furthermore, in the diversity reception disconnection method of the present invention, the controlling step preferably combines the signals output by the receiver devices and, when it is judged in the judging step that the disconnection requirement is satisfied, the controlling step preferably multiplies the output signal output by the receiver device constituting the disconnection target by a weight matrix so that the reception quality of the output signal drops by a fixed value at fixed times.

According to the mobile communication terminal and diversity reception disconnection method of the present invention, communications with the base station can be continued when diversity reception is cut.

EXPLANATION OF THE REFERENCE SYMBOLS

Figure 1:
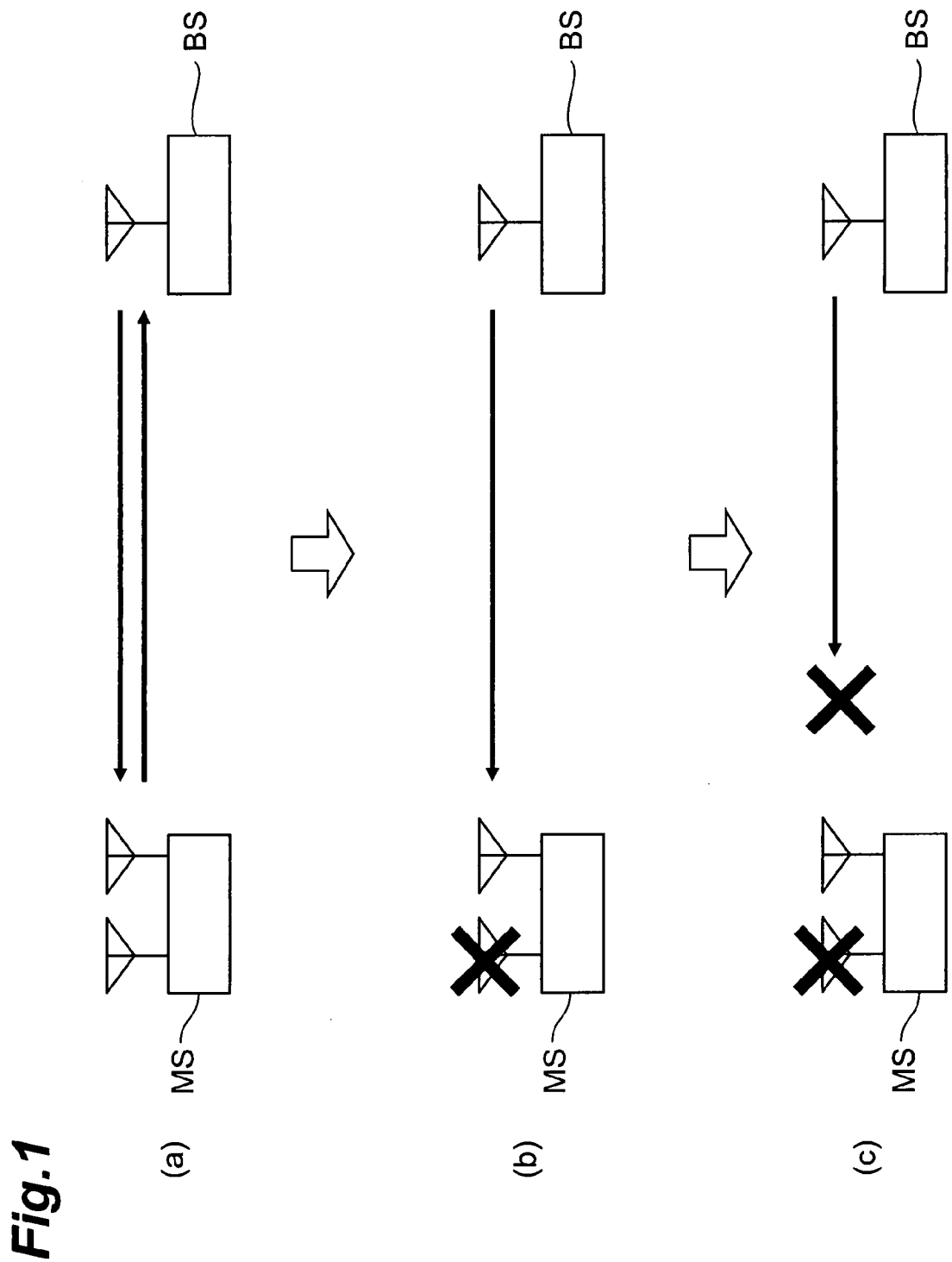
FIG. 1 serves to illustrate the conditions of a case where diversity reception is unexpectedly cut.
Figure 2:
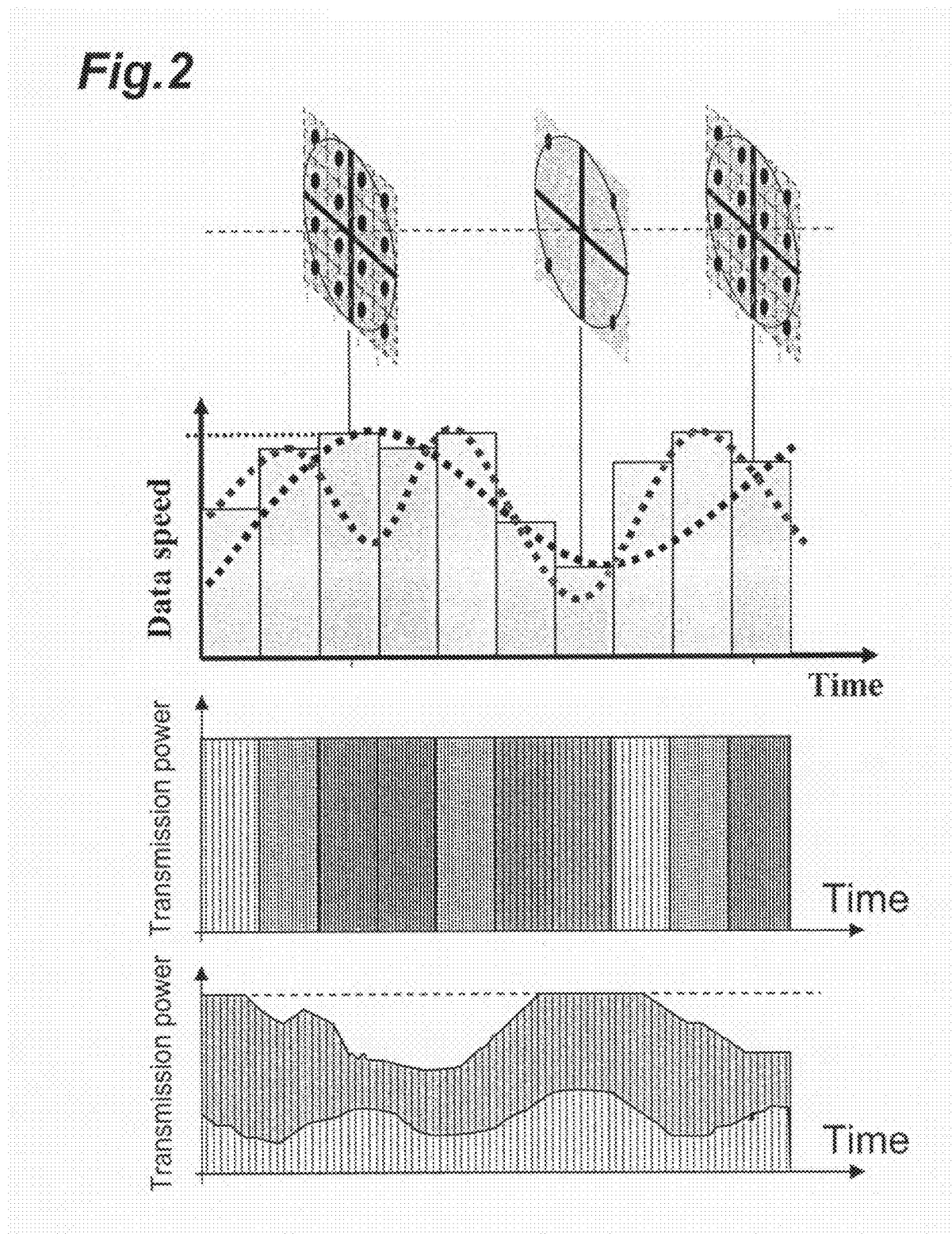
FIG. 2 is a conceptual view of HSDPA.
Figure 3:
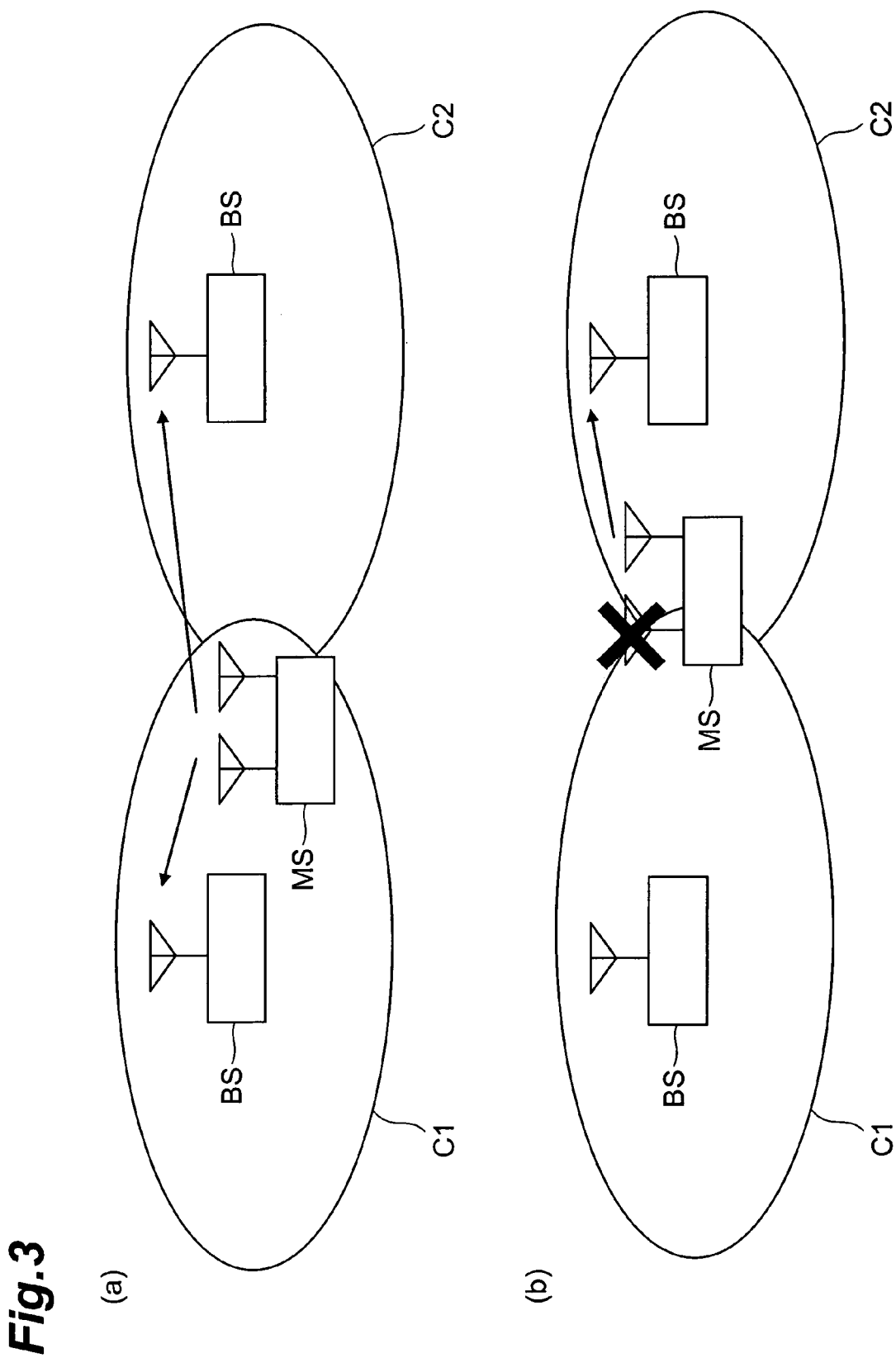
FIG. 3 serves to illustrate handover from an HSDPA application cell to a non-application cell.
Figure 4:
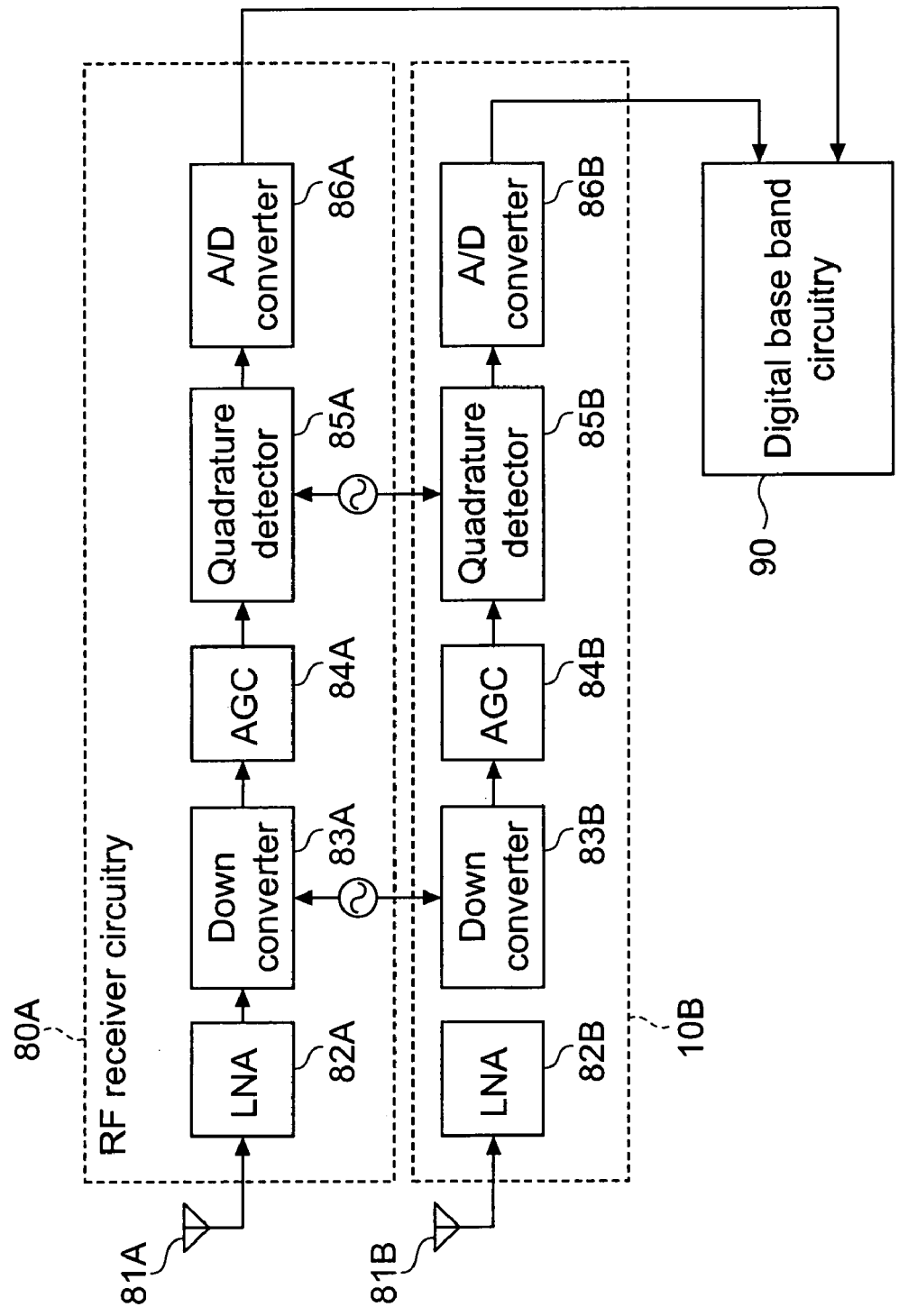
FIG. 4 exemplifies the constitution of a conventional diversity reception mobile communication terminal.
Figure 5:
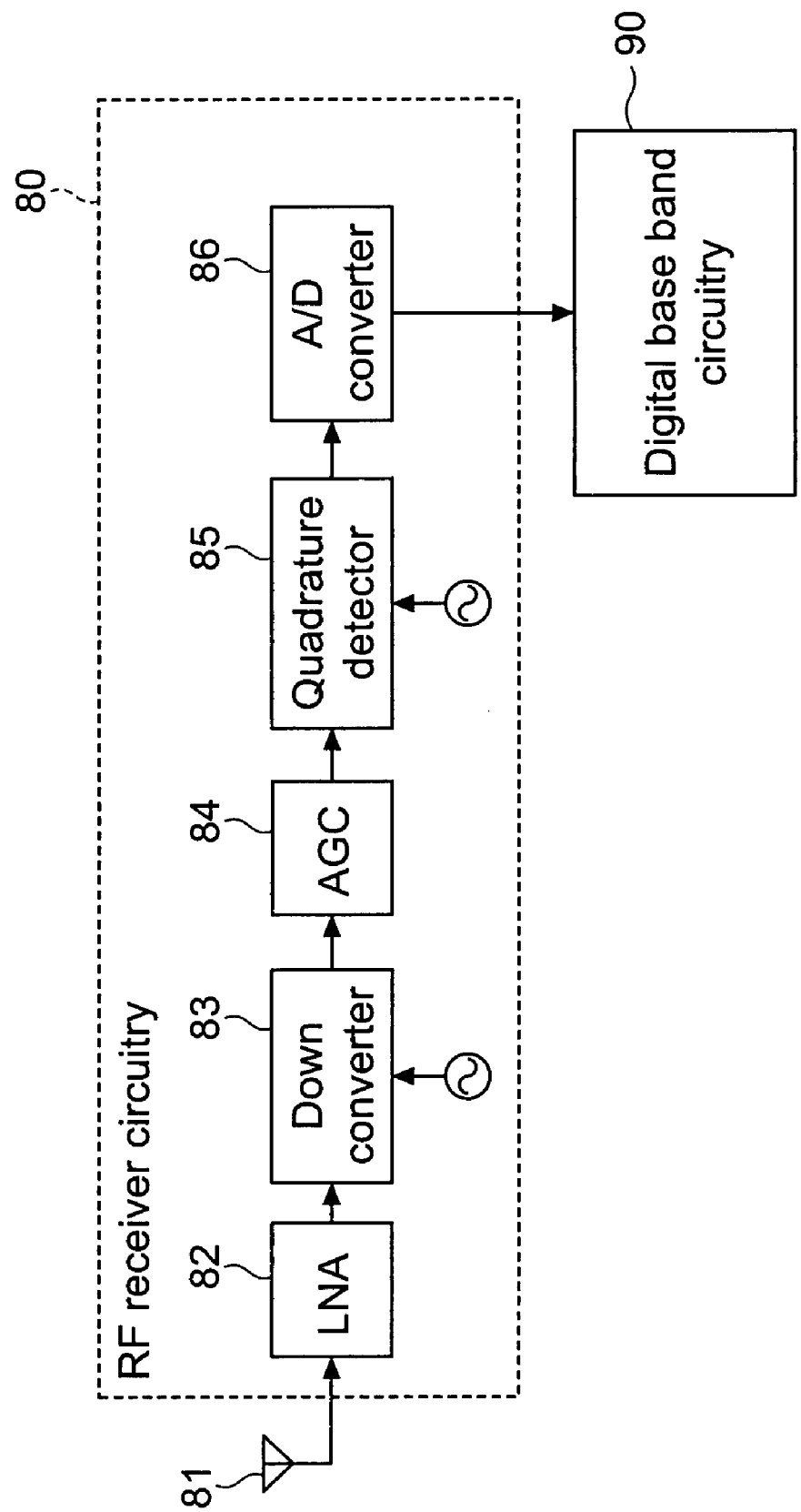
FIG. 5 exemplifies the constitution of a conventional non-diversity reception mobile communication terminal.

10 . . . RF receiver circuitry, 11 . . . antenna, 12 . . . LNA, 13 . . . downconverter, 14 . . . AGC, 15 . . . quadrature detector, 16 . . . A/D converter, 20 . . . digital baseband circuitry, 21 . . . de-spreader, 22 . . . path search section, 23 . . . channel estimation section, 24 . . . rake combining section, 25 . . . de-modulator, 26 . . . de-coder, 27 . . . instantaneous SIR measurement section, 28 . . . judgment section, 29 . . . gain control section, 2A . . . dummy noise generator, 2B . . . weight matrix.

BEST MODE FOR CARRYING OUT THE INVENTION

The respective embodiments of the mobile communication terminal and diversity reception disconnection method according to the present invention will be described hereinbelow based on the drawings. Further, repetitive description is omitted here by assigning the same reference numerals to the same elements in the drawings.

First Embodiment

The first embodiment of the present invention will be described first. The mobile communication terminal of the first embodiment has, for example, an HSDPA high-speed wireless communication function and implements high-speed wireless communications by increasing the frequency usage efficiency by using multivalued modulation such as high-rate error correction numerals, 16QAM (Quadrature Amplitude Modulation), or 64 QAM. Further, mobile communication terminals include, for example, cellular phones, personal handy phones (PHS), and portable information terminals with a communication function (PDA).

Figure 6:
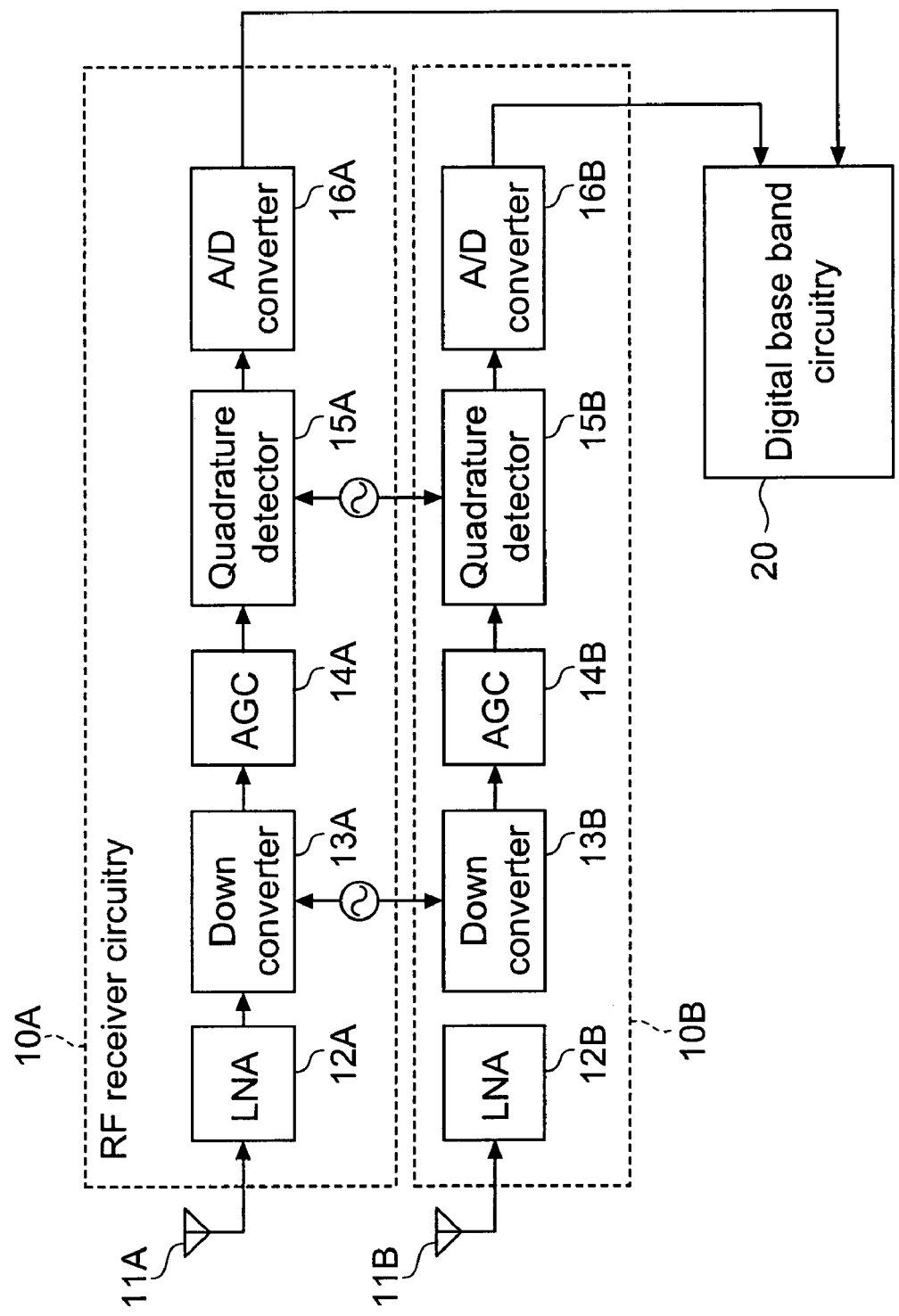
FIG. 6 exemplifies the circuitry constitution of the reception section of the mobile communication terminal of a first embodiment.

FIG. 6 exemplifies the circuitry constitution of the reception section of the mobile communication terminal of the first embodiment. As shown in FIG. 6, the reception section of the mobile communication terminal comprises two RF receiver circuitries 10A and 10B (receiver devices) having a diversity function and a Digital baseband circuitry 20 that performs demodulation processing and signal combining processing and so forth on the basis of the digital signals output by the respective RF receiver circuitries 10. The RF receiver circuitry 10A functions as a main receiver device that continually receives RF signals that are transmitted by the base station and the RF receiver circuitry 10B functions as an auxiliary receiver device that receives RF signals only when diversity is activated.

Further, there need not be two RF receiver circuitries 10. There may instead be three or more RF receiver circuitries 10. That is, a diversity function may be implemented by combining or selecting a signal output by a plurality of RF receiver circuitries 10.

The RF receiver circuitries 10 comprises an antenna 11, an LNA (Low Noise Amplifier) 12, a downconverter 13, an AGC (Automatic Gain Control) 14, a quadrature detector 15, and an A/D converter 16.

The LNA 12 amplifies the RF signal received by the antenna 11 while leaving the RF bandwidth unchanged. The downconverter 13 converts the signal amplified by the LNA 12 into an intermediate frequency (baseband bandwidth). The AGC 14 subjects the signal converted by the downconverter 13 to linear amplification. The quadrature detector 15 performs quadrature detection based on the signal amplified by the AGC 14. The A/D converter 16 converts the analog signal subjected to quadrature detection by the quadrature detector 15 into a digital signal.

Figure 7:
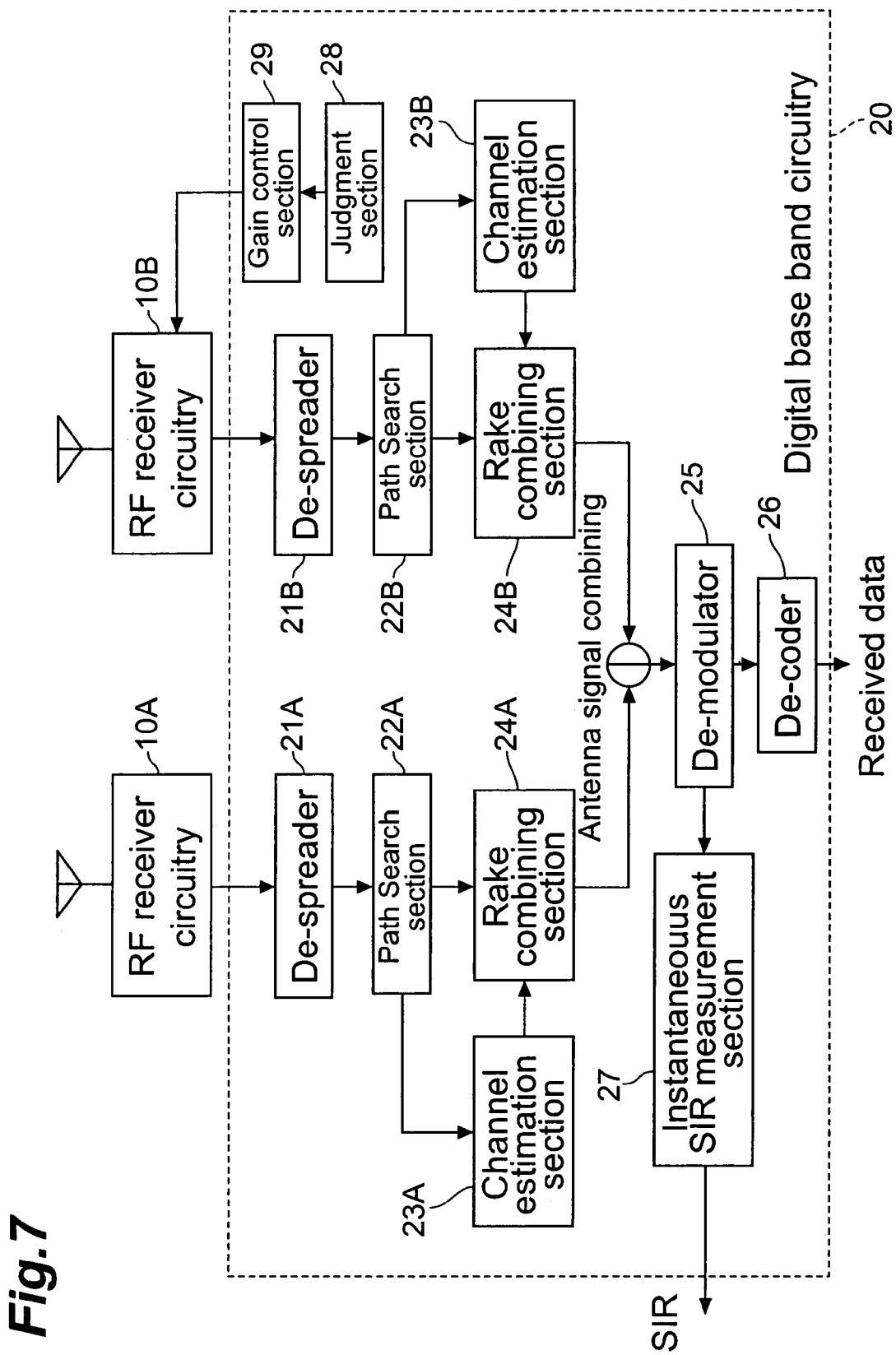
FIG. 7 exemplifies the circuitry constitution of the Digital baseband circuitry shown in FIG. 6.

The circuitry constitution of the digital baseband circuitry 20 will be described next with reference to FIG. 7. As shown in FIG. 7, the digital baseband circuitry 20 comprises de-spreaders 21A and 21B, path search sections 22A and 22B, channel estimation sections 23A and 23B, rake combining sections 24A and 24B, a de-modulator 25, a de-coder 26, an instantaneous SIR measurement section 27, a judgment section 28 judgment means), and a gain control section 29 (control means). The de-spreader 21 de-spreads the signal output by the RF receiver circuitry 10. The path search section 22 detects the delay wave from the signal that has been de-spread. The channel estimation section 23 calculates the channel estimation value for estimating the transmission path. The rake combining sections 24 combine the respective signals by multiplying the detected delay wave by the channel estimation value. The de-modulator 25 demodulates the signal. The de-coder 26 performs signal decoding. The instantaneous SIR measurement section 27 measures the SIR.

The judgment section 28 judges whether a predetermined disconnection requirement for disconnecting the diversity reception has been satisfied. The predetermined disconnection requirement corresponds to the mobile communication terminal shifting to a state where same is unable to receive the diversity reception results. Described specifically, the predetermined disconnection requirement corresponds to the mobile communication terminal shifting from an HSDPA application cell to an HSDPA non-application cell, the mobile communication terminal shifting to a standby state after communications have ended, or the mobile communication terminal shifting to a standby state as a result of the power being turned ON, for example.

The gain control section 29 controls the gain of the AGC14B contained in the RF receiver circuitry 10B. When described specifically, the gain control section 29 reduces the gain of the AGC14B by a fixed value at fixed times when it is judged by the judgment section 28 that the mobile communication terminal has satisfied the above disconnection requirement. More specifically, for example, the control section 29 exercises control so that the gain decreases 0.3 dB every 10 milliseconds. As a result, the reception power of the signal received by the RF receiver circuitry 10B can be gradually reduced.

Figure 10:
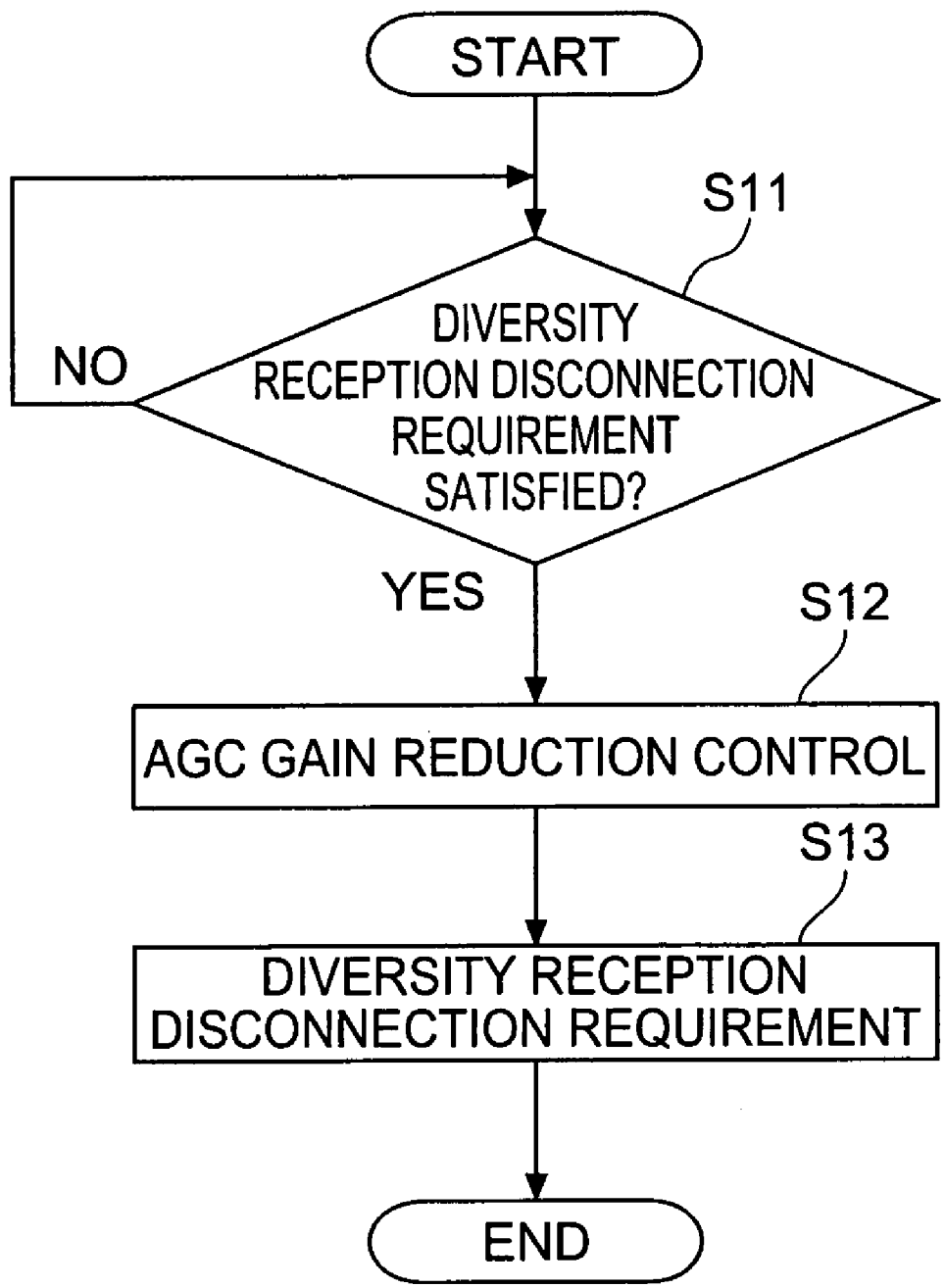
FIG. 10 is a flowchart that exemplifies the flow of the diversity disconnection processing of the mobile communication terminal of the first embodiment.

The flow of the diversity disconnection processing of the mobile communication terminal of the first embodiment will be described next with reference to FIG. 10.

First, the judgment section 28 of the mobile communication terminal judges whether the predetermined disconnection requirement for disconnecting the diversity reception has been satisfied (step S11). When the judgment is NO (step S11: NO), the judgment section 28 shifts to the processing of step S11.

On the other hand, when it is judged that the predetermined disconnection requirement has been satisfied in the judgment of step S11 (step S11: YES), the gain control section 29 reduces the gain of the AGC14B contained in the RF receiver circuitry 10B which is the disconnection target by a fixed value at fixed times (step S12).

After the level of the signal output by the AGC14B has reached zero, the diversity reception is cut (step S13).

The timing for disconnecting the diversity reception in step S13 is not limited to after the level of the signal output by the AGC14B has reached zero. The timing may also be before the level of the signal output by the AGC14B has reached zero. This is because, when the diversity reception is cut, the extent of the deterioration of the SIR can be reduced as long as the level of the signal output by the AGC14B can be reduced to a certain degree. However, disconnection the diversity reception after the level of the signal output by the AGC14B has reached zero has a considerable effect in preventing the deterioration of the SIR. Further, the diversity reception may also be cut after a predetermined time has elapsed after the requirement for disconnecting the diversity reception has been satisfied.

As mentioned earlier, a situation where the SIR deteriorates rapidly can be prevented when the diversity reception is cut by reducing the gain of the AGC14B before the diversity reception is cut. Hence, communications with the base station can be continued when the diversity reception has been cut. In addition, the power consumption can be reduced because the diversity reception can be cut under circumstances where the results of the diversity reception cannot be obtained. Moreover, power consumption can be reduced further by disconnecting the LNA 12 and A/D converter 16 or the like after the AGC 14B has been completely cut.

Second Embodiment

Figure 8:
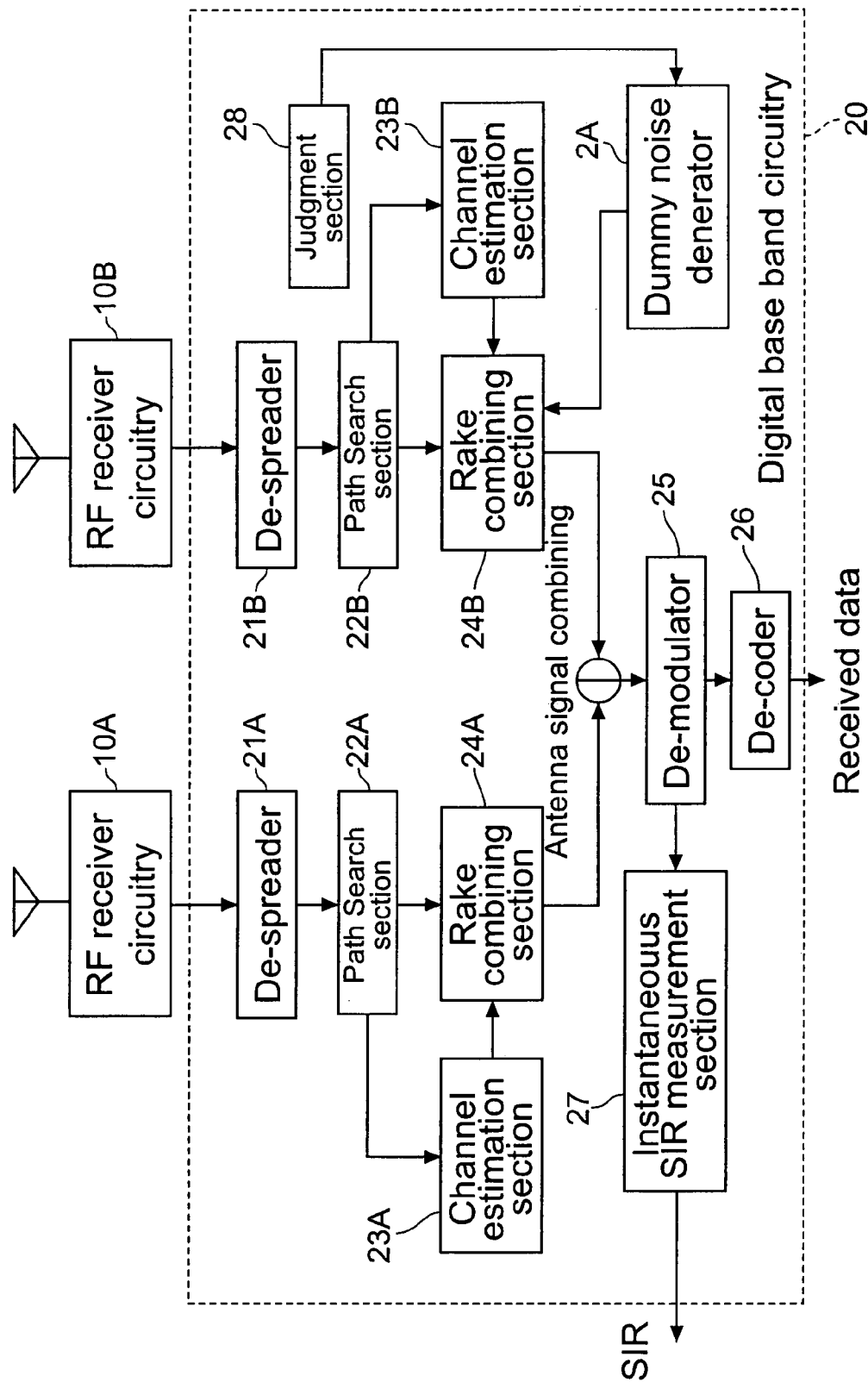
FIG. 8 exemplifies the circuitry constitution of the Digital baseband circuitry according to a second embodiment.

The second embodiment of the present invention will be described next. The mobile communication terminal of the second embodiment differs from the mobile communication terminal of the first embodiment in that part of the circuitry constitution of the digital baseband circuitry 20 is different. This difference will be illustrated by referencing the circuitry constitution of the digital baseband circuitry 20 of the second embodiment shown in FIG. 8. As shown in FIG. 8, the digital baseband circuitry 20 of the second embodiment differs from the digital baseband circuitry 20 of the first embodiment in that the digital baseband circuitry 20 of the second embodiment further comprises a dummy noise generator 2A and does not comprise the gain control section 29 provided in the digital baseband circuitry 20 of the first embodiment. The remaining circuitry constitution is the same as the constituent elements of the mobile communication terminal of the first embodiment and, therefore, the same reference numerals are assigned to the same constituent elements which will not be described here. The differences from the first embodiment will be described in detail hereinbelow.

The dummy noise generator 2A adds pseudonoise to the signal that is output by the RF receiver circuitry 10B which constitutes the disconnection target. To describe this in specific terms, the dummy noise generator 2A adds the noise level of the pseudonoise to the rake combining section 24B while increasing the noise level of the pseudonoise by a fixed value at fixed times. As a result, the reception quality of the signal received by the RF receiver circuitry 10B can be gradually reduced. The pseudonoise can be generated by producing a random digital signal by means of the dummy noise generator 2A, for example.

Figure 11:
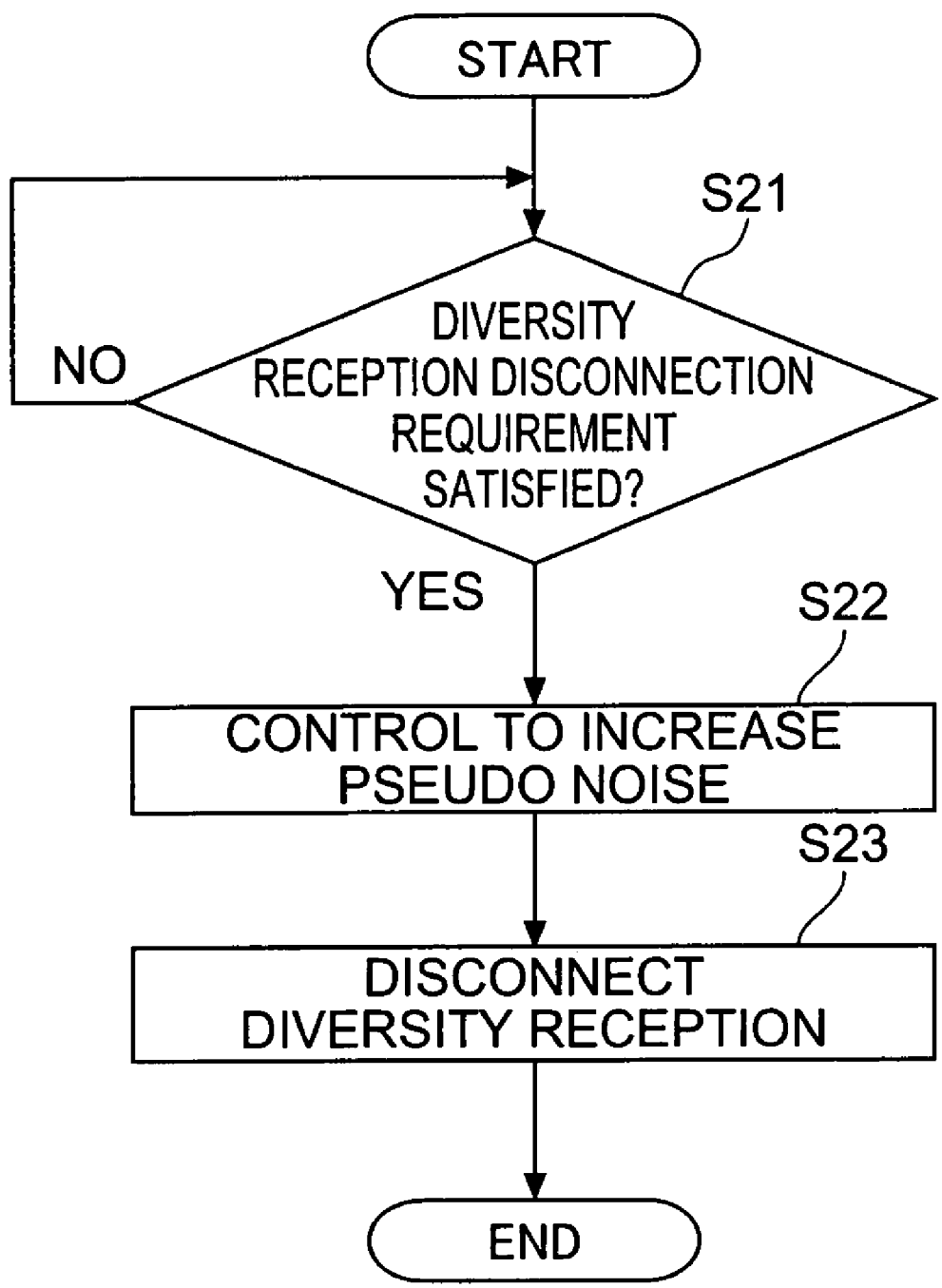
FIG. 11 is a flowchart that exemplifies the flow of the diversity disconnection processing of the mobile communication terminal of the second embodiment.

The flow of the diversity reception processing of the mobile communication terminal of the second embodiment will be described next with reference to FIG. 11.

First, the judgment section 28 of the mobile communication terminal judges whether a predetermined disconnection requirement for disconnecting the diversity reception is satisfied (step S21). When the judgment is NO (step S21: NO), the judgment section 28 moves on to the processing of step S21.

However, when it is judged that the predetermined disconnection requirement has been satisfied in the judgment of step S21 (step S21: YES), the dummy noise generator 2A outputs the pseudonoise to the rake combining section 24B that processes signals output by the RF receiver circuitry 10B which constitutes the disconnection target while increasing the noise level of the pseudonoise by a fixed value at fixed times (step S22).

After the level of the signal output by the rake combining section 24B has reached zero, the diversity reception is disconnected (step S23).

Further, the timing for disconnecting the diversity reception in step S23 is not limited to after the level of the signal output by the rake combining section 24B has reached zero. The level of the signal output by the rake combining section 24B may also be before the level of the signal output by the rake combining section 24B has reached zero. This is because, when the diversity reception is cut, the extent of the deterioration of the SIR can be reduced as long as the level of the signal output by the rake combining section 24B can be reduced to a certain degree. However, disconnecting the diversity reception after the level of the signal output by the rake combining section 24B has reached zero has a considerable effect in preventing the deterioration of the SIR. Further, the diversity reception may also be cut after a predetermined time has elapsed (100 milliseconds, for example) after the requirement for disconnecting the diversity reception has been satisfied.

As mentioned earlier, a situation where the SIR deteriorates rapidly can be prevented when the diversity reception is cut because the combined gain can be reduced by reducing the level of the signal output by the rake combining section 24B before the diversity reception is cut. Hence, communications with the base station can be continued when the diversity reception has been disconnected. In addition, the power consumption can be reduced because the diversity reception can be disconnected under circumstances where the results of diversity reception cannot be obtained. Moreover, power consumption can be reduced further by disconnecting the LNA 12 and A/D converter 16 or the like after the AGC 14B has been completely cut.

Furthermore, as mentioned earlier, in the case of the mobile communication terminal of the second embodiment, the reception quality of the signal received by the RF receiver circuitry 10B is gradually lowered by producing a random digital signal. Therefore, the digital baseband circuitry 20 which is provided in the terminal beforehand can be changed rather than changing a circuitry that is subsequently provided in the terminal such as the RF receiver circuitry 10. Hence, the function of the invention of this application can be easily mounted.

Third Embodiment

Figure 9:
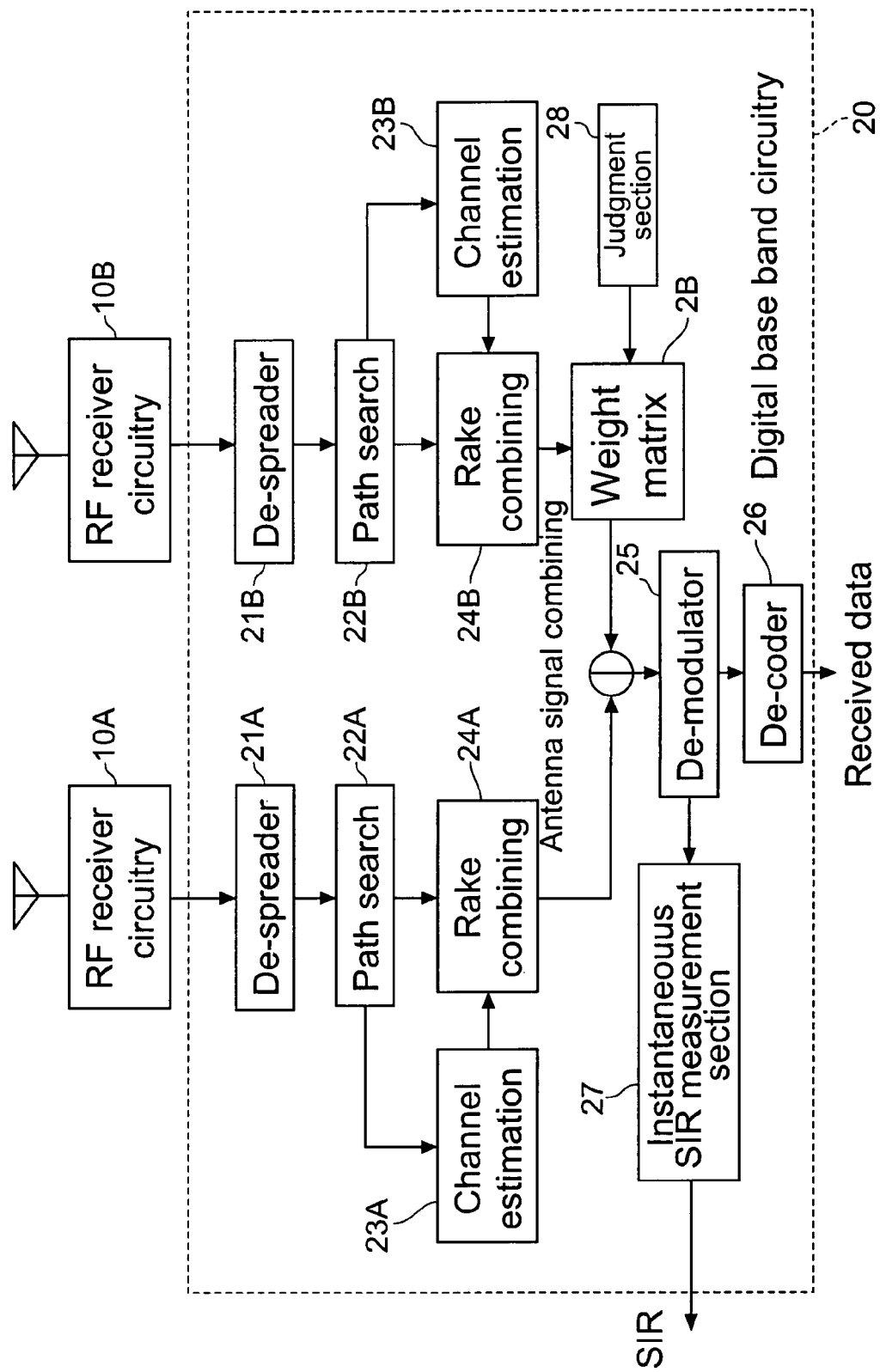
FIG. 9 exemplifies the circuitry constitution of the Digital baseband circuitry according to a third embodiment.

The third embodiment of the present invention will be described next. The mobile communication terminal of the third embodiment differs from the mobile communication terminal of the first embodiment in that part of the circuitry constitution of the digital baseband circuitry 20 is different. This difference will be illustrated by referencing the circuitry constitution of the digital baseband circuitry 20 of the third embodiment shown in FIG. 9. As shown in FIG. 9, the digital baseband circuitry 20 of the third embodiment differs from the digital baseband circuitry 20 of the first embodiment in that the digital baseband circuitry 20 of the third embodiment further comprises a weight matrix 2B and does not comprise the gain control section 29 provided in the digital baseband circuitry 20 of the first embodiment. The remaining circuitry constitution is the same as the constituent elements of the mobile communication terminal of the first embodiment and, therefore, the same reference numerals are assigned to the same constituent elements which will not be described here. The differences from the first embodiment will be described in detail hereinbelow.

The weight matrix 2B multiplies the signals that are output by the RF receiver circuitry 10B which constitutes the disconnection target by a weight matrix. To describe this specifically, the weight matrix 2B multiplies a signal output by the rake combining section 24B (in particular, only desired reception signal with the noise component removed is desirable) by a weight matrix so that the reception quality of the signal drops by a fixed value at fixed times. The weighting matrix that is used can be a matrix of the kind that reduces the reception quality 0.3 dB at a time every 100 milliseconds so that the reception level approaches zero after one second and the combined gain is eliminated, for example. As a result, the reception quality of the signal received by the RF receiver circuitry 10B can be gradually reduced.

Figure 12:
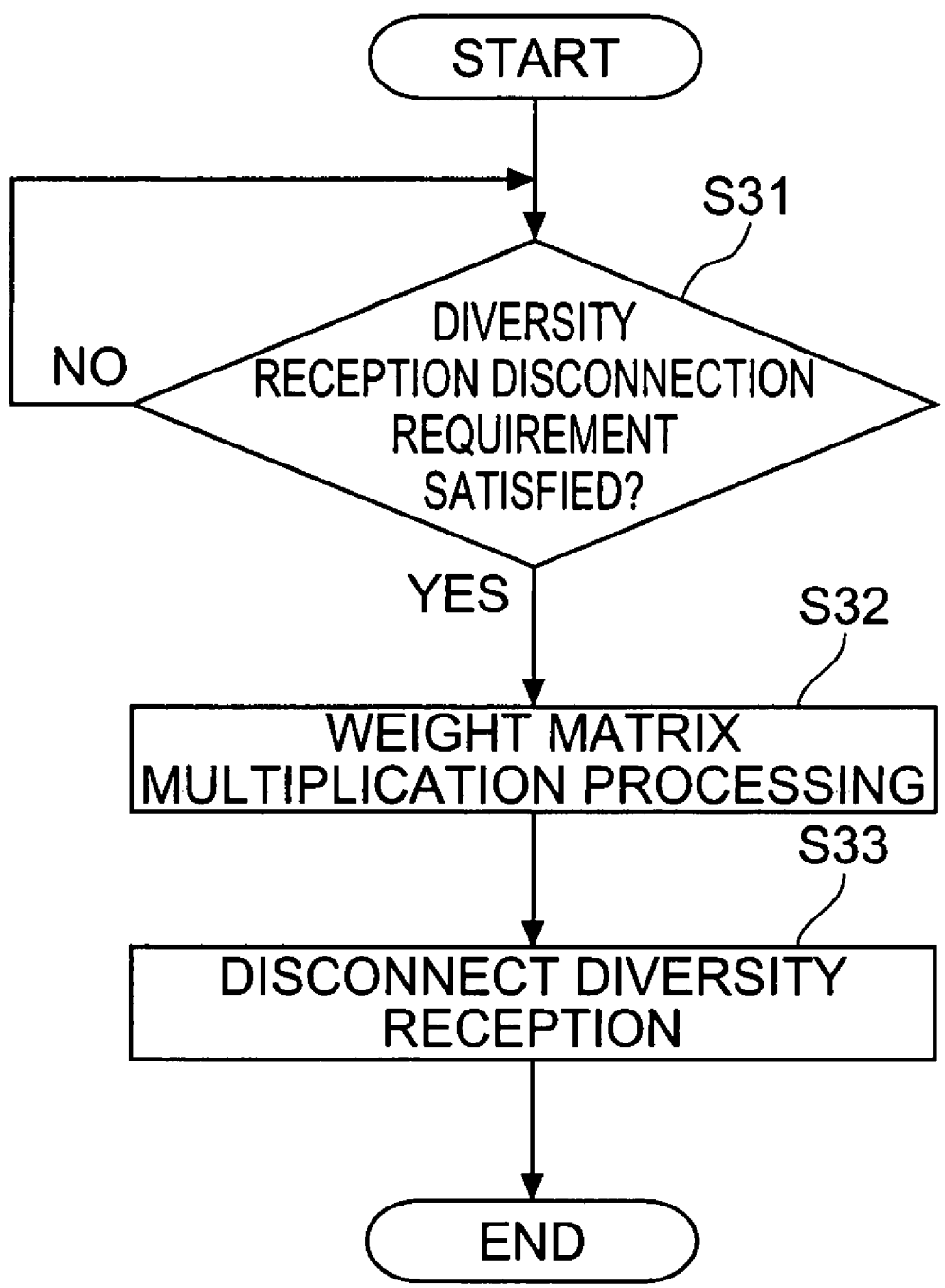
FIG. 12 is a flowchart that exemplifies the flow of the diversity disconnection processing of the mobile communication terminal of the third embodiment.

The flow of the diversity reception processing of the mobile communication terminal of the third embodiment will be described hereinbelow with reference to FIG. 12.

First, the judgment section 28 of the mobile communication terminal judges whether the predetermined disconnection requirement for disconnecting diversity reception has been satisfied (step S31). When the judgment is NO (step S31: NO), the judgment section 28 moves on to the processing of step S31.

On the other hand, when it is judged that the predetermined disconnection requirement has been satisfied in the judgment of step S31 (step S31: YES), the weight matrix 2B multiplies the signal that is output by the rake combining section 24B that processes the signal output by the RF receiver circuitry 10B which constitutes the disconnection target by a weight matrix so that the reception quality of the signal drops by a fixed value at fixed times (step S32).

Diversity reception is cut after the level of the signal obtained through multiplication by the matrix has reached zero (step S33).

Further, the timing for disconnecting diversity reception in step S33 is not limited to after the level of the signal obtained through multiplication by the matrix has reached zero. The timing may also be before the level of the signal obtained through multiplication by the matrix has reached zero. This is because, when the diversity reception is disconnected, the extent of the deterioration of the SIR can be reduced as long as the level of the signal obtained through multiplication by the matrix can be reduced to a certain degree. However, disconnecting the diversity reception after the level of the signal obtained through multiplication by the matrix has reached zero has a considerable effect in preventing the deterioration of the SIR. Further, the diversity reception may also be disconnected after a predetermined time (1 second, for example) has elapsed after the requirement for disconnecting the diversity reception has been satisfied.

As mentioned earlier, a situation where the SIR deteriorates rapidly can be prevented when the diversity reception is cut because the combined gain can be reduced by reducing the level of the signal output by the rake combining section 24B before the diversity reception is cut. Hence, communications with the base station can be continued when the diversity reception has been cut. In addition, the power consumption can be reduced because the diversity reception can be cut under circumstances where the results of the diversity reception cannot be obtained. Moreover, power consumption can be reduced further because diversity reception can be cut in situations where the results of diversity reception cannot be obtained.

Moreover, as mentioned earlier, in the case of the mobile communication terminal of the third embodiment, the reception quality of the signal received by the RF receiver circuitry 10B is gradually lowered by producing a random digital signal. Therefore, the digital baseband circuitry 20 which is provided in the terminal beforehand can be changed rather than changing a circuitry that is subsequently provided in the terminal such as the RF receiver circuitry 10. Hence, the function of the invention of this application can be easily mounted.

Finally, the diversity reception disconnection method according to the present invention is a method for disconnecting the diversity reception of a receiver terminal that comprises a plurality of receiver devices. This method is characterized in that the gain of the automatic gain control amplifier is gradually lowered when diversity reception is cut, the gain is gradually lowered by slowly adding pseudonoise in the baseband circuitry when the diversity reception is cut, and the gain is gradually lowered by performing multiplication for each antenna in the baseband circuitry by means of a multiplication coefficient when the diversity reception is disconnected.

Here, in the case of the mobile communication terminal and diversity reception disconnection method according to the present invention, at the end of communications or in the event of handover to an HSDPA non-compatible cell (the mobile communication terminal is able to judge whether the migration destination is an HSDPA-compatible cell or an HSDPA non-compatible cell by means of a control signal from the base station), control to gradually lower the gain from the digital baseband circuitry to the AGC (a drop of 0.3 dB every 10 milliseconds, for example) (control to lower the power, that is, bring about a reduction in the reception power) is performed. This method allows diversity reception to be disconnected without inducing a sudden deterioration of the SIR and permits a reduction in power consumption while continuing communications with the base station. In addition, when the power of the AGC is completely cut, a further reduction in the power consumption is made possible by disconnecting the power of the LNA, A/D converter and so forth.

Furthermore, as shown in FIG. 7, the diversity reception mobile communication terminal has a constitution that obtains a gain by performing signal combining by means of the digital baseband circuitry. The digital baseband circuitry of a diversity reception mobile communication terminal with a function for adding pseudonoise is shown in FIG. 8. Pseudonoise signifies a random digital signal created intentionally by the digital baseband circuitry of the mobile communication terminal. By gradually adding such pseudonoise to the rake combining section (gradually increasing the noise level), the gain from one antenna can be lowered (that is, the combined gain can be reduced) when disconnecting diversity reception. Further, diversity reception can be disconnected without inducing rapid deterioration of the SIR by disconnecting diversity reception after a fixed time (100 milliseconds, for example) has elapsed. This constitution can be implemented by producing the earlier-mentioned random digital signal. Hence, because it is sufficient to change only the digital baseband circuitry in the terminal without tweaking the other circuitries such as the RF receiver circuitry, there is the advantage that mounting is straightforward.

Moreover, a circuitry diagram of a digital circuitry to which a function for weighting the rake-combined signal of a diversity antenna is shown in FIG. 9. By gradually multiplying the rake-combined signal (only the desired reception signal in particular, with the noise component removed) by a weight matrix, the reception power from the diversity antenna can be reduced. The weight matrix in this case reduces the desired wave signal of the SIR by 0.3 dB at a time every 100 milliseconds. Further, the value of the desired wave signal approaches zero after a fixed time (one second, for example) has elapsed and the combined gain is eliminated. As a result, diversity reception can be disconnected without inducing a sudden deterioration of the SIR by adding a weighting function to a conventional digital baseband circuitry. This constitution also has the advantage that mounting can be easily performed by changing only the digital baseband circuitry.

The invention claimed is:

1. A mobile communication terminal having a diversity reception function comprising a plurality of receiver devices, comprising:

judging means for judging whether a disconnection requirement for disconnecting diversity reception is satisfied; and controlling means for exercising control so that the reception quality of signals received by the receiver devices drops, wherein, when it is judged by the judging means that the disconnection requirement is satisfied, the control means lowers the reception quality of the signal received by the receiver device constituting a disconnection target by a fixed value at fixed times.

2. The mobile communication terminal according to claim 1, wherein the controlling means controls the gain of the amplifier contained in the receiver devices and, when it is judged by the judging means that the disconnection requirement is satisfied, the controlling means lowers the gain of the amplifier contained in the receiver device constituting the disconnection target by a fixed value at fixed times.

3. The mobile communication terminal according to claim 1, wherein the controlling means combines the signals output by the receiver devices and, when it is judged by the judging means that the disconnection requirement is satisfied, the controlling means adds pseudonoise to the signal output by the receiver device constituting the disconnection target while increasing the signal level of the pseudonoise by a fixed value at fixed times.

4. The mobile communication terminal according to claim 1, wherein the controlling means combines the signals output by the receiver devices and, when it is judged by the judging means that the disconnection requirement is satisfied, the controlling means multiplies the output signal output by the receiver device constituting the disconnection target by a weight matrix so that the reception quality of the output signal drops by a fixed value at fixed times.

5. A diversity reception disconnection method of a diversity reception function mobile communication terminal that comprises a plurality of receiver devices, comprising:

a judging step of judging whether a diversity reception disconnection requirement is satisfied; and a controlling step of exercising control so that the reception quality of a signal received by the receiver device drops, wherein the controlling step lowers the reception quality of the signal received by the receiver device constituting a disconnection target by a fixed value at fixed times when it is judged in the judging step that the disconnection requirement is satisfied.

6. The diversity reception disconnection method according to claim 5, wherein the controlling step controls the gain of the amplifier contained in the receiver device and, when it is judged in the judging step that the disconnection requirement is satisfied, the controlling step reduces the gain of the amplifier contained in the receiver device constituting the disconnection target by a fixed value at fixed times.

7. The diversity reception disconnection method according to claim 5, wherein the controlling step combines signals output by the receiver devices and, when it is judged in the judging step that the disconnection requirement is satisfied, the controlling step adds pseudonoise to the signal output by the receiver device constituting the disconnection target while increasing the signal level of the pseudonoise by a fixed value at fixed times.

8. The diversity reception disconnection method according to claim 5, wherein the controlling step combines the signals output by the receiver devices and, when it is judged in the judging step that the disconnection requirement is satisfied, the controlling step multiplies the output signal output by the receiver device constituting the disconnection target by a weight matrix so that the reception quality of the output signal drops by a fixed value at fixed times.

* * * * *